(12) United States Patent
Maeda et al.

(10) Patent No.: US 7,770,957 B2
(45) Date of Patent: Aug. 10, 2010

(54) SEAT APPARATUS FOR VEHICLE

(75) Inventors: Kenji Maeda, Kariya (JP); Toshiyuki Tanaka, Kariya (JP); Katsuaki Suzuki, Nagoya (JP); Motohisa Nakamura, Kakamigahara (JP); Takashi Mukoujima, Toyota (JP); Eiji Mizutani, Kariya (JP); Toshio Araki, Kariya (JP)

(73) Assignees: Aisin Seiki Kabushiki Kaisha, Kariya-shi (JP); Toyota Boshoku Kabushiki Kaisha, Kariya-shi (JP)

( * ) Notice: Subject to any disclaimer, the term of this patent is extended or adjusted under 35 U.S.C. 154(b) by 306 days.

(21) Appl. No.: 12/056,814

(22) Filed: Mar. 27, 2008

(65) Prior Publication Data

US 2008/0246299 A1    Oct. 9, 2008

(30) Foreign Application Priority Data

Mar. 30, 2007    (JP)    ............................. 2007-091665

(51) Int. Cl.
*B60N 2/02*    (2006.01)
(52) U.S. Cl. .................................................. 296/65.09
(58) Field of Classification Search .................. 296/63, 296/64, 66, 67, 69, 65.01, 65.06, 65.09
See application file for complete search history.

(56) References Cited

U.S. PATENT DOCUMENTS

| | | | | |
|---|---|---|---|---|
| 6,293,622 | B1 * | 9/2001 | Horisawa | 296/65.01 |
| 6,695,378 | B2 * | 2/2004 | Hanagan | 296/65.01 |
| 7,367,624 | B2 * | 5/2008 | Garland | 296/65.09 |
| 7,506,910 | B2 * | 3/2009 | Leitner et al. | 296/65.01 |

FOREIGN PATENT DOCUMENTS

| | | |
|---|---|---|
| JP | 7-22355 | 5/1995 |
| JP | 2005-96633 | 4/2005 |

* cited by examiner

*Primary Examiner*—Lori L Lyjak
(74) *Attorney, Agent, or Firm*—Oblon, Spivak, McClelland, Maier & Neustadt, L.L.P.

(57) ABSTRACT

A seat apparatus for a vehicle, which includes an inner slide rail, an outer slide rail including an outer upper rail and an outer lower rail, a seat cushion provided slidably in a longitudinal direction of the vehicle and configured to be flipped up to a wall portion of the vehicle compartment to be in a storage position, a hinge mechanism fixing the outer upper rail to the seat cushion, a bearing smoothly sliding the outer upper rail relative to the outer lower rail, a spring provided around a rotational shaft of the hinge mechanism for biasing the seat cushion in a direction to be flipped up, and at least one rotating member provided between the outer upper rail and the outer lower rail so as to receive a load in a lateral direction of the vehicle applied to the outer upper rail by the spring.

7 Claims, 6 Drawing Sheets

SEAT APPARATUS FOR VEHICLE

CROSS REFERENCE TO RELATED APPLICATIONS

This application is based on and claims priority under 35 U.S.C. §119 with respect to Japanese Patent Application No. 2007-091665 filed on Mar. 30, 2007, the entire content of which is incorporated herein by reference.

FIELD OF THE INVENTION

The present invention relates to a seat apparatus for a vehicle.

BACKGROUND

Known rear seats provided in the rear of a vehicle compartment of, for example, a wagon type vehicle or a recreation vehicle (RV) are configured to be folded and stowed when the rear seats are not in use in order to expand the cargo space. For example, according to a known seat apparatus for a vehicle described in JP7-22355Y, an outer slide rail is mounted to a wheel house panel at a side wall of a vehicle body via a hinge mechanism, and a rear seat (seat cushion) is flipped up (folded) to be in a storage position at a wall portion. According to the construction described in JP7-22355Y, because the rear seat (seat cushion) is flipped up via the hinge mechanism to be in a storage position, a large degree of force is required to raise the seat to be in the storage position, thus causing difficulties for stowing the seat.

In order to solve the foregoing drawback, another known seat apparatus is disclosed in JP2005-96633A, which includes a spring means (assist spring) biasing the seat cushion in a direction for flipping the seat cushion up when stowing the seat cushion.

According to the seat apparatus described in JP2005-96633A, the force required for flipping the seat cushion up is reduced because of the biasing force of the spring when stowing the seat cushion at the wall portion of the vehicle compartment from a state where the seat is ready to be used.

The foregoing known seat apparatuses for the vehicle are structured to receive a load being in upward and downward directions from an upper rail by a lower rail via a bearing at a slide rail. However, with the construction of the seat apparatus for the vehicle including the assist spring, the hinge mechanism is rotated in a direction against the biasing force of the spring means, and thus is retained while storing the large degree of spring force biased by the spring means. In consequence, the lower rail fixed to the vehicle body is assumed to receive the load not just in the upward and downward directions but in a lateral direction and/or in a transverse direction, which results in a deformation of the lower rail and the bearing configured to receive the force primarily in the upward and downward direction, and thus causing a faulty operation. Although increasing a plate thickness of the lower rail and changing the material of the lower rail to a material with high rigidity are considered in order to prevent the deformation of the lower rail and the bearing as foregoing, those devices increase the weight and a manufacturing cost of the lower rail.

A need thus exists for a seat apparatus for a vehicle which is not susceptible to the drawback mentioned above.

SUMMARY OF THE INVENTION

In light of the foregoing, the present invention provides a seat apparatus for a vehicle, which includes an inner slide rail adapted to be mounted to a vehicle body, an outer slide rail adapted to be mounted to a portion of the vehicle body closer to a wall portion of a vehicle compartment, the outer slide rail including an outer upper rail and an outer lower rail which slidably houses the outer upper rail therein and is adapted to be mounted to the vehicle body, a seat cushion provided slidably in a longitudinal direction of the vehicle by the inner slide rail and the outer slide rail, the seat cushion configured to be flipped up to the wall portion of the vehicle compartment to be in a storage position, a hinge mechanism fixing the outer upper rail to the seat cushion, a bearing smoothly sliding the outer upper rail relative to the outer lower rail, a spring provided around a rotational shaft of the hinge mechanism for biasing the seat cushion in a direction to be flipped up, and at least one rotating member provided between the outer upper rail and the outer lower rail so as to receive a load in a lateral direction of the vehicle applied to the outer upper rail by the spring.

According to another aspect of the present invention, a seat apparatus for a vehicle includes an inner slide rail adapted to be mounted to a vehicle body, an outer slide rail adapted to be mounted to a portion of the vehicle body closer to a wall portion of a vehicle compartment, the outer slide rail including an outer upper rail and an outer lower rail which slidably houses the outer upper rail therein and is adapted to be mounted to the vehicle body, a seat provided slidably in a longitudinal direction of the vehicle by the inner slide rail and the outer slide rail, the seat configured to be flipped up to the wall portion of the vehicle compartment to be in a storage position, a hinge mechanism fixing the outer upper rail to the seat, a bearing smoothly sliding the outer upper rail relative to the outer lower rail, a spring provided around a rotational shaft of the hinge mechanism for biasing the seat in a direction to be flipped up, and at least one rotating member provided between the outer upper rail and the outer lower rail so as to receive a load in a lateral direction of the vehicle applied to the outer upper rail by the spring.

According to further aspect of the present invention, a seat apparatus for a vehicle, adapted to be provided with a seat cushion being slidable in a longitudinal direction of the vehicle by means of an inner slide rail adapted to be mounted to a vehicle body and an outer slide rail adapted to be mounted to a portion of the vehicle body close to a wall portion, wherein the seat cushion is configured to be flipped up to the wall portion of the vehicle compartment to be in a storage position, includes the outer slide rail including an outer upper rail adapted to be mounted to the seat cushion via a hinge mechanism which includes a spring provided around a rotational shaft of the hinge mechanism for biasing the seat cushion in a direction to be flipped up, and an outer lower rail adapted to be mounted to the vehicle body and housing the outer upper rail therein so as to slide smoothly by means of a bearing, and at least one rotating member provided between the outer upper rail and the outer lower rail so as to receive a load in a lateral direction of the vehicle applied to the outer upper rail by the spring.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of a seat apparatus for a vehicle will be explained with reference to illustrations of drawing figures as follows.

Figure 1:
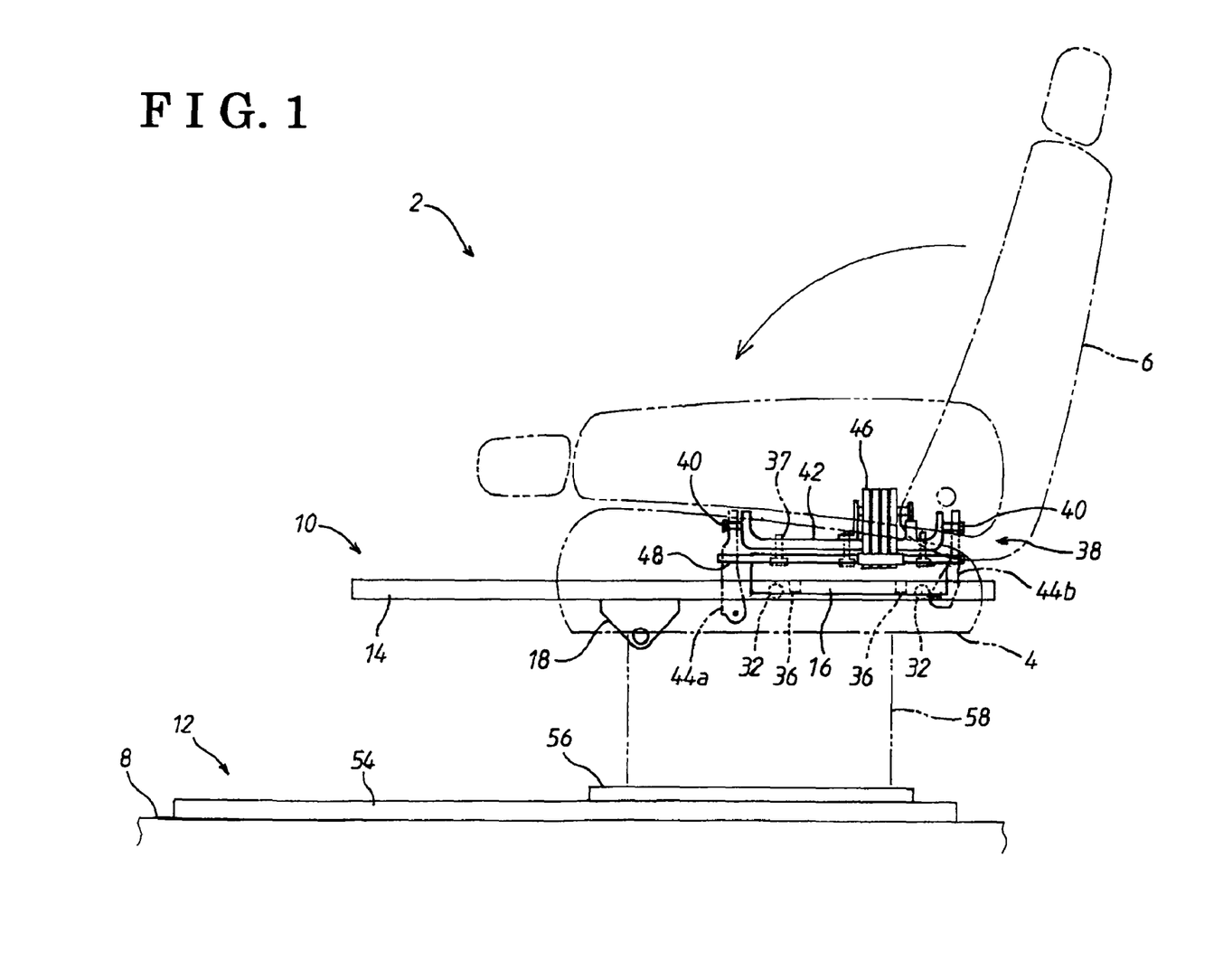
FIG. 1 is a schematic side view of a seat apparatus for a vehicle according to a first embodiment of the present invention.

As shown in FIG. 1, a rear seat 2 for a minivan or a van, or the like, includes a seat cushion 4 and a seatback 6. The seatback 6 is configured to recline backward and to contact a top surface of the seat cushion 4 when being folded forward to the maximum, that is being folded downwardly towards the seat cushion 4, to form approximately one unit therewith.

A floor 8 (i.e., serving as a vehicle body) provided under the rear seat 2 includes an outboard portion which is positioned closer to a wall portion in a vehicle compartment and an inboard portion which is positioned closer to the center of the vehicle in a lateral direction. The outboard portion compartment is provided at an elevated position higher than the inboard portion of the floor 8. An outer slide rail 10, is provided at a higher portion, that is, the outboard portion of the floor 8, whereas an inner slide rail 12, is provided at a lower portion serving as a vehicle floor, that is, the inboard portion of the floor 8. The outer slide rail 10 includes an outer lower rail 14 and an outer upper rail 16. The outer lower rail 14 is mounted by means of a bracket 18 to the higher portion (e.g., a top portion of a tire house) of the floor 8 closer to the wall portion so as to extend in a longitudinal direction of a vehicle. The outer lower rail 14 is shaped to have an opening at a top portion thereof in a longitudinal direction (i.e., a longitudinal direction of the vehicle) and a channel configuration in cross-section. The outer lower rail 14 includes a first base portion 20 which is fixed to the higher portion of the floor 8, a pair of side wall portions 22, 22 extending in a lateral direction from the both sides of the first base portion 20 and being bent to extend upright (vertically extend), and a pair of first bent wall portions 24 which are extended from the respective side wall portions 22 inwardly in a lateral direction and are further bent downwardly to extend towards the base portion 20.

Figure 3:
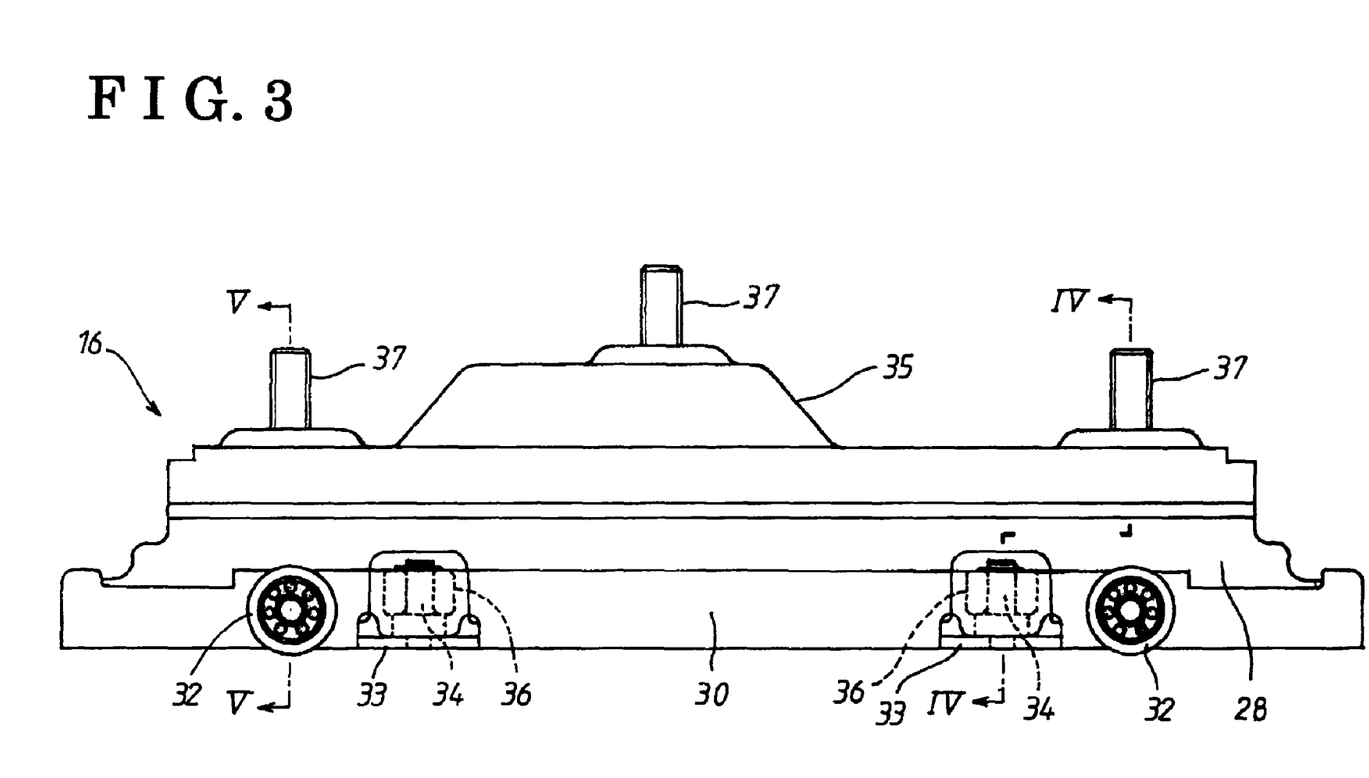
FIG. 3 is a front view of an outer upper rail according to the first embodiment of the present invention.
Figure 4:
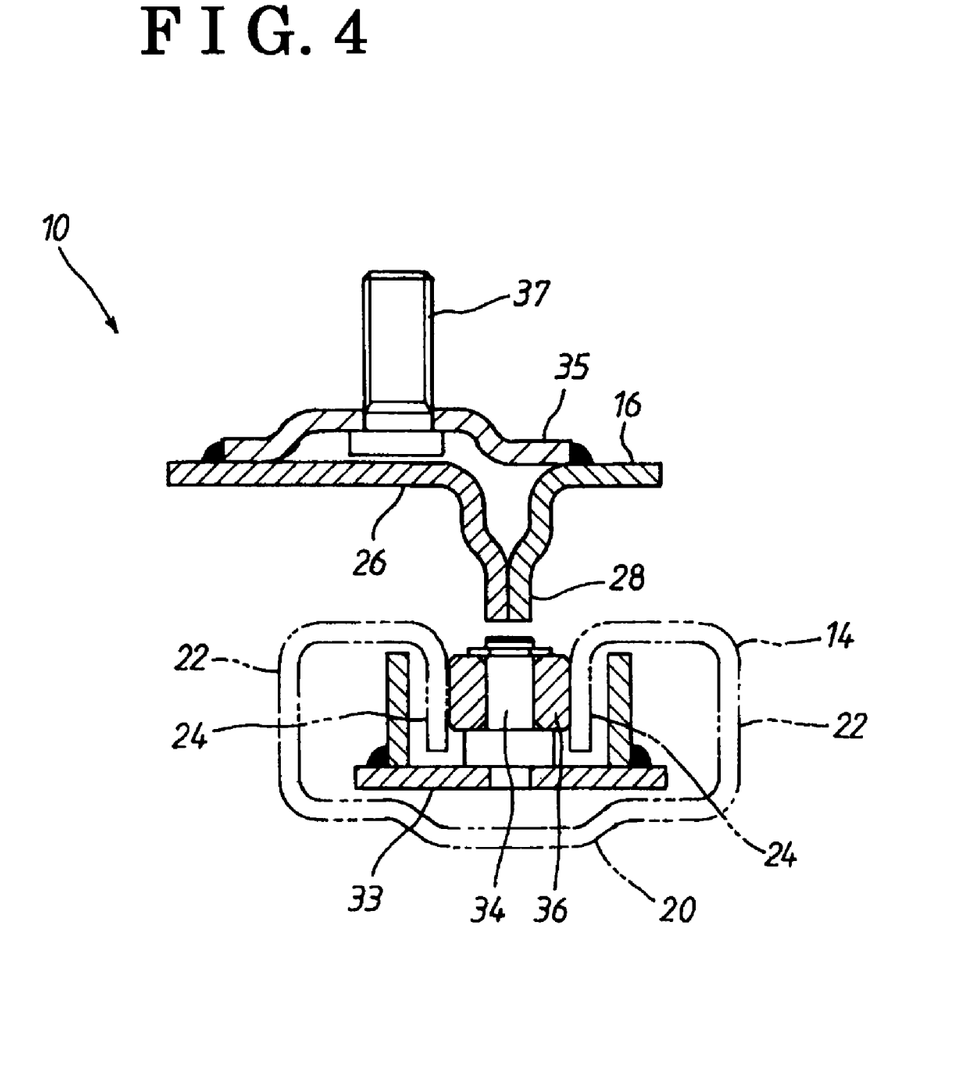
FIG. 4 is a cross-sectional view showing an assembling state of a rotating member mounted to an outer slide rail taken on line IV-IV in FIG. 3 according to the first embodiment of the present invention.
Figure 5:
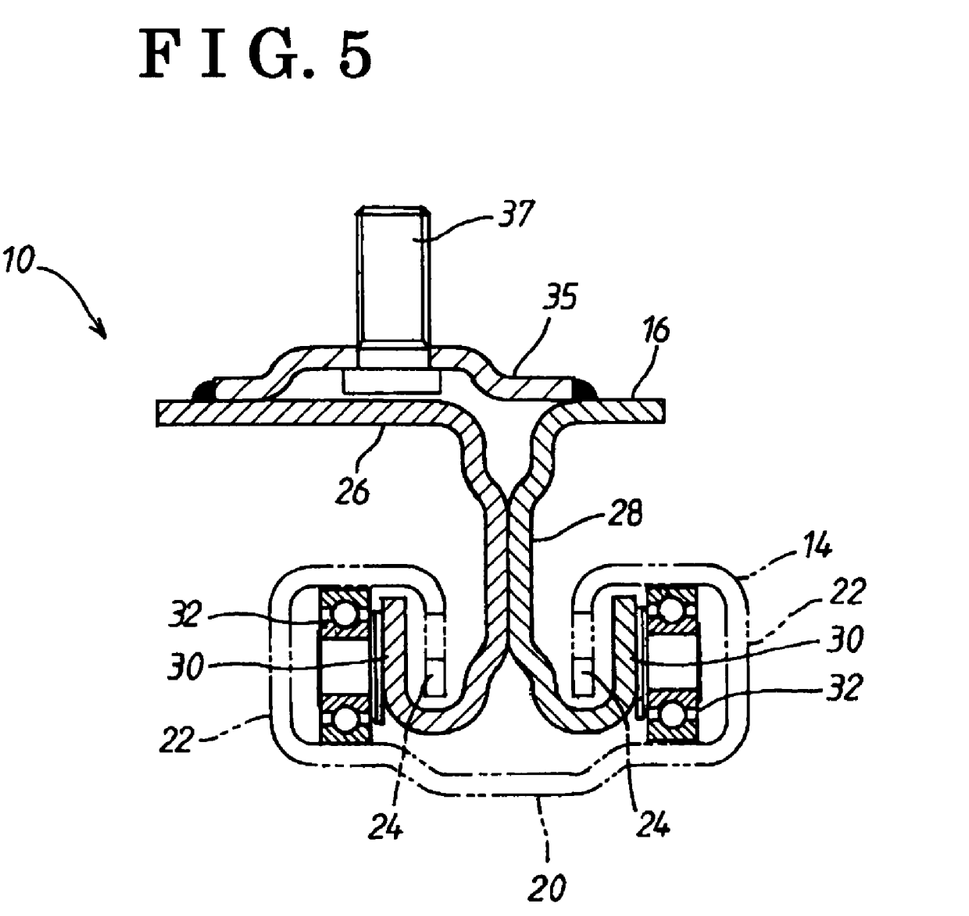
FIG. 5 is a cross-sectional view showing an assembling state of a bearing mechanism mounted to the outer slide rail taken on line V-V in FIG. 3 according to the first embodiment of the present invention.

The outer upper rail 16 is slidably arranged in the outer lower rail 14. The outer upper rail 16 includes, as shown in FIGS. 3, 4 and 5, a second base portion 26 which is assembled to a hinge mechanism, a vertical wall portion 28 which extends from the second base portion 26, and a pair of second bent wall portions 30 which respectively extend outwardly in a lateral direction from the vertical wall portion 28 and are further bent to each extend upwardly between the corresponding side wall portion 22 of the outer lower rail 14 and the first bent wall portion 24. As shown in FIGS. 3 and 5, a bearing mechanism 32 having a rotational axis in a width direction (lateral direction) of a vehicle is provided at a side surface of each of the second bent wall portions 30 (e.g., the bearing mechanisms 32 are provided at four positions including front and rear portions of the second bent wall portions 30 in a longitudinal direction and each right and left side thereof). As shown in FIG. 5, the outer upper rail 16 is smoothly slid relative to the outer lower rail 14 by means of the bearing mechanisms 32, 32 and the bearing mechanism 32 is configured to receive a load in an upward and downward direction applied by the outer upper rail 16 to the outer lower rail 14. As shown in FIGS. 3-5, a rotating member 36 having a rotational shaft 34 in a vertical direction is provided at an inner side of the bearing mechanisms 32 in a lateral direction of the vehicle. The rotating member 36, for example, cylindrically formed and made of steel rotates smoothly by means of grease, or the like, injected between the rotational shaft 34 and the rotating member 36. Further, as shown in FIGS. 3 and 4, the rotating member 36 is provided between the first bent wall portions 24, 24 of the outer lower rail 14, for example, at two positions in the longitudinal direction thereof. The rotating members 36 are arranged, for example, by removing a portion of the vertical wall portion 28 and a portion of the second bent wall portion 30 and by, for example, welding a shaft retaining plate 33 (i.e., serving as an attaching member) on which the rotational shaft 34 is vertically provided to a bottom portion of the second bent wall portion 24. By the arrangement in which an outer peripheral surface of the rotating member 36 is in contact with an inner peripheral side surface of the first bent wall portion 24, the load applied in the vehicle width direction from the outer upper rail 16 is received. A lock mechanism is provided between the outer lower rail 14 and the outer upper rail 16 so that the outer upper rail 16 is fixed at predetermined slide positions by the lock mechanism. An assembling plate 35 is welded on a top surface of the outer upper rail 16 and an assembling bolt 37 is provided at the assembling plate 35 so as to be vertically extended.

Figure 2:
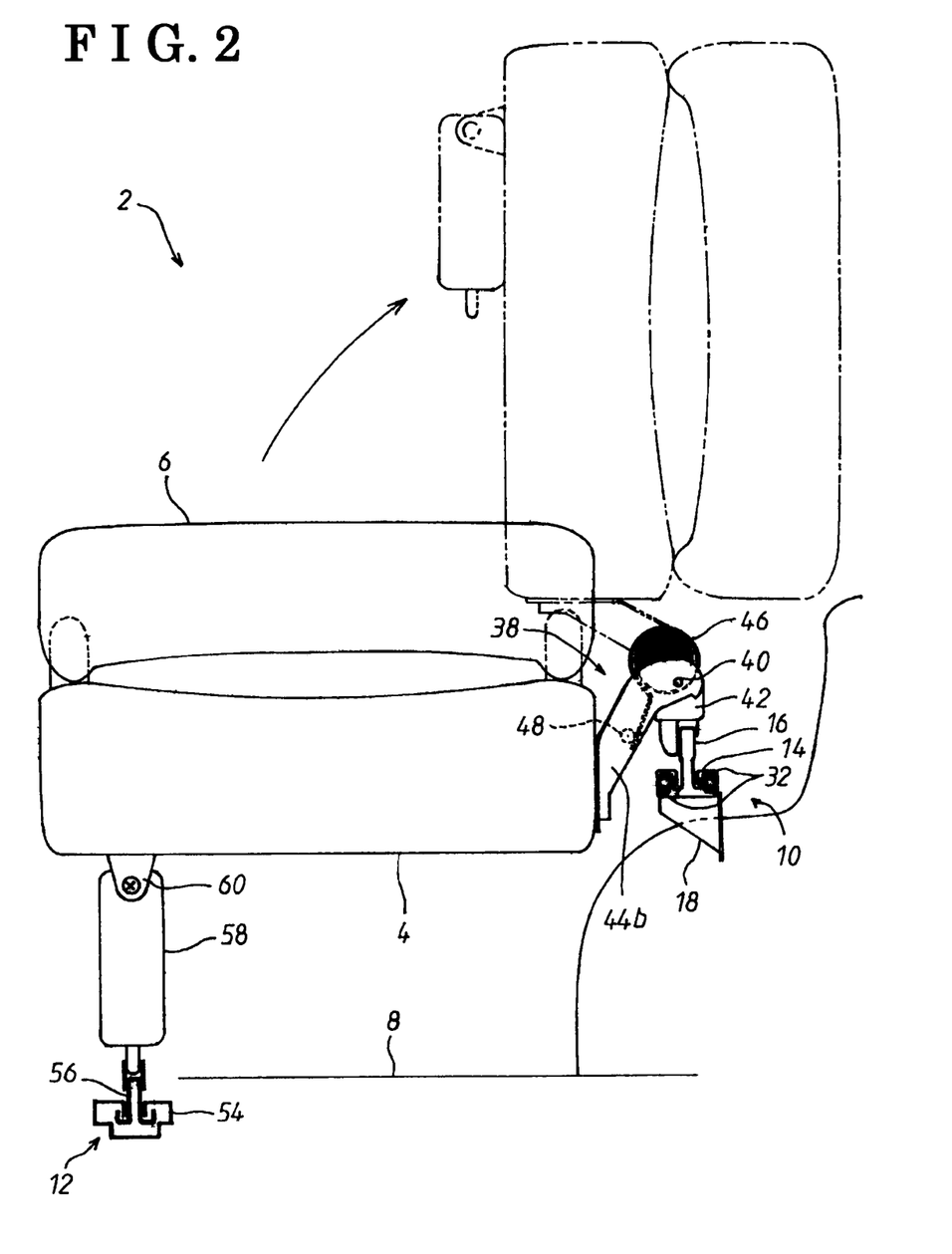
FIG. 2 is a schematic backside view of the seat apparatus for the vehicle according to the first embodiment of the present invention.

A hinge mechanism 38 is assembled to the assembling bolt 37. The hinge mechanism 38 includes, as shown in FIGS. 1 and 2, two rotational shafts 40, 40, a hinge frame 42 and two brackets 44a, 44b. The rotational shafts 40, 40 are extended in a horizontal direction separately from each other and coaxially to each other. A bottom end of the hinge frame 42 is mounted to a top portion of the outer upper rail 16. Each of side ends of the hinge frame 42 is connected to a first end of the corresponding brackets 44a, 44b via the rotational shafts 40, 40 respectively. A second end of the brackets 44a, 44b is assembled to a side surface of the seat cushion 4. The rotational shafts 40, 40 are arranged in parallel to a longitudinal direction of the hinge frame 42 so as to be positioned at the center thereof in a width direction. As shown in FIG. 1, for example, four conical coil springs 46 are provided in a series in a longitudinal direction of the vehicle. End portions at the center of the springs 46 are fixed to the hinge frame 42 and peripheral end portions of the springs 46 are assembled to a connecting rod 48 which is laterally bridged between the bracket members 44a, 44b. The bracket members 44a, 44b are biased in a direction to flip the rear seat 2 up (i.e., clockwise in FIG. 2) by means of the spring 46.

The inner slide rail 12 is provided at the inboard side of the rear seat 2 in the vehicle compartment. The inner slide rail 12 includes an inner lower rail 54 and an inner upper rail 56. The inner lower rail 54, including an opening at a top portion thereof in a longitudinal direction and shaped in a channel form in cross-section extends in the longitudinal direction of the vehicle and is fixedly mounted to the floor 8. An inner upper rail 56 is slidably provided in the inner lower rail 54. Plural bearings are provided between the inner lower rail 54 and the inner upper rail 56, and the inner upper rail 56 smoothly slides relative to the inner lower rail 54 by means of the bearings. Further, a lock mechanism is provided between the inner lower rail 54 and the inner upper rail 56. The inner upper rail 56 is configured to be fixed at a predetermined slide position by the lock mechanism. A leg engagement portion is provided on a top portion of the inner upper rail 56, and a bottom end portion of a supporting leg 58 of the seat cushion 4 is detachably engaged with the inner upper rail 56 via the leg engagement portion. A top end portion of the supporting leg 58 is pivotally provided on a bottom surface of the seat cushion 4 so as to be foldable by means of the hinge portion 60.

An operation of the seat apparatus for the vehicle explained above will be explained as follows. In case of using the rear seat 2 (vehicle seat) being stowed facing the wall portion of the vehicle, the seat cushion 4 on which the seatback 6 is folded to form approximately one unit is rotated about the rotational shaft 40 of the hinge mechanism 38 by 90 degrees so as to be arranged in approximately horizontal state. Then, the supporting leg 58 which is at the folded position is extended downwards so that the bottom end portion of the supporting leg 58 is engaged with the leg engagement portion of the inner upper rail 56. Thereafter, the seatback 6 which is at the folded position is raised upward (i.e., unfolded backward in the longitudinal direction of the vehicle).

When returning the position of the rear seat 2 to a position which is ready for a use by an occupant, the hinge mechanism 38 is rotated in a direction against the biasing force of the spring 46, and is retained in a state that stores a large degree of the spring force by the spring 46. Accordingly, a spring load generated in a lateral direction of the vehicle affects the outer lower rail 14 via the outer upper rail 16 assembled to the hinge mechanism 38. In those circumstances, the rotating member 36 is pivotally supported by the shaft retaining plate 33 fixed to the pair of second bent wall portions 30, 30 of the outer upper rail 16 so as to be rotatable about the shaft center which is arranged in a vertical direction, and is provided between the pair of first bent wall portions 24 of the outer lower rail 14. Accordingly, the rotating member 36 is rotatable while receiving the spring load applied in the lateral direction of the vehicle, and thus the outer lower rail 14 and the bearing mechanism 32 are prevented from being deformed, and the outer slide rail 10 is smoothly operated. Because it is not necessary to increase a plate thickness of the outer lower rail 14 and to produce the bearing with the material having higher rigidity in order to prevent the deformation of the outer lower rail 14 and the bearing mechanism 32, the seat apparatus for the vehicle which is downsized, and reduced in weight and manufacturing cost is provided.

Figure 6:
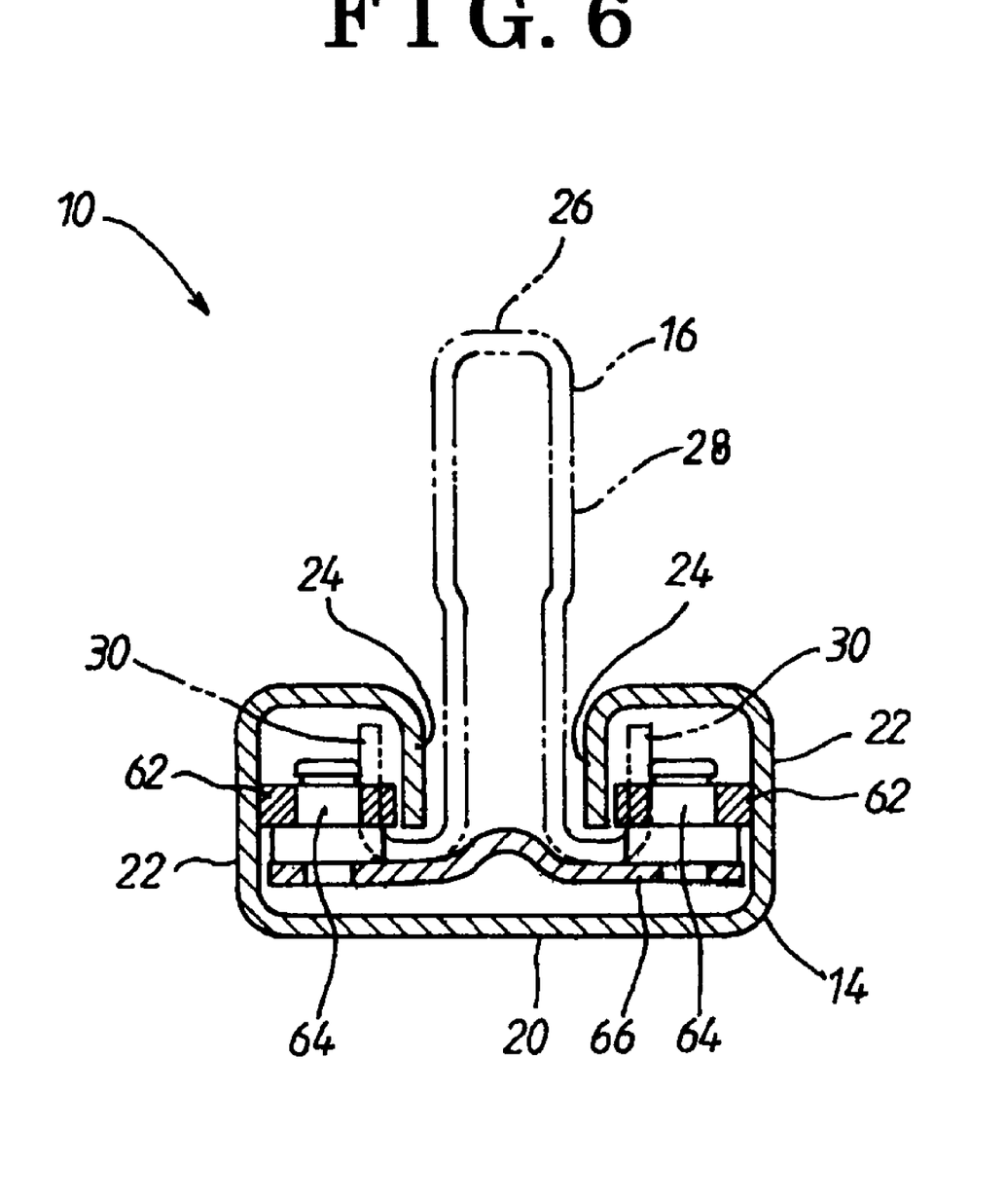
FIG. 6 is a view showing an assembling state of a rotating member according to a second embodiment of the present invention.

A second embodiment of the seat apparatus for the vehicle will be explained as follows. As shown in FIG. 6, a rotational shaft 64 having a shaft center in a vertical direction is provided upright at both end portions (i.e., first and second end portions) of a shaft retaining plate 66 (i.e., serving as an attaching member) which is, for example, welded on a bottom portion of the pair of the second bent wall portions 30, 30. The shaft retaining plate 66 extends towards the side wall portions 22, 22. A rotating member 62 is pivotally supported by each of the rotational shaft 64 to face each of the side wall portions 22 so as to be rotatable. Each of the rotating members 62, 62 is positioned between the side wall portion 22 of the pair of outer lower rails 14, 14 and the pair of first bent wall portions 24, 24 which are positioned at the inner side relative to the side wall portions 22, 22. Other constructions of the second embodiment are common to the first embodiment, and thus the explanation thereof will not be repeated.

The respective rotating members 62, 62 according to the second embodiment are pivotally supported by the first and second end portions of the shaft retaining plate 66 which is fixed to the pair of second bent wall portions 30, 30 and extends towards the side wall portions 22, 22. Further, the rotating members 62, 62 are rotatable while being in contact with the corresponding side wall portions 22, 22, respectively. Accordingly, the spring load applied in the lateral direction of the vehicle is received dispersedly, and further, the seat apparatus is downsized and reduced in weight.

Although the rotating member is cylindrically shaped and made of steel according to the embodiments explained above, the construction and materials of the rotating member is not limited to the foregoing. For example, the rotating member may be made of reinforced plastic and/or may include a built-in bearing mechanism.

Further, although the rotating member is attached to the outer upper rail by welding the attaching member on which the rotational shaft pivotally supporting the rotating member onto the outer upper rail according to the embodiments described above, the method for mounting the rotating member to the outer upper rail is not limited to the foregoing. For example, an attaching member provided with a female screw portion may be fixed to the outer upper rail by means of a bolt, or the like.

Further, although the seat apparatus including the seat cushion is described in the embodiments, the construction of the seat apparatus is not limited to the structure with the seat cushion. For example, a seat apparatus may not include a cushion or may include a seat plate which is not recognized as the cushion.

According to the embodiment of the present invention, when returning the seat cushion 4 at the flipped up position to the position which is ready for the use by an occupant, the hinge mechanism 38 is rotated in a direction against the biasing force of the spring 46, and is retained in a state that stores the large degree of the spring force by the spring 46. Accordingly, the spring load generated by the spring 46 is applied to the outer lower rail 14 in the lateral direction of the vehicle via the outer upper rail 16 fixed to the hinge mechanism 38. In those circumstances, because the rotating member 36, 62 receiving the spring load in the lateral direction is provided between the outer upper rail 16 and the outer lower rail 14, the outer lower rail 14 and the bearing mechanism 32 are prevented from being deformed and the outer slide rail 10 is smoothly operated. Because it is not necessary to increase a plate thickness of the outer lower rail 14 and to change the material of the bearing mechanism 32 to another material with high rigidity in order to prevent the deformation of the outer lower rail 14 and the bearing 32, the downsized seat apparatus for the vehicle with reduced weight and manufacturing cost is provided. Further, the seat cushion is flipped up with smaller degree of force without faulty operation.

According to the embodiment of the seat apparatus, the outer lower rail 14 includes the first base portion 20 adapted to be mounted to the floor 18 serving as the vehicle body, the pair of side wall portions 22, 22 upwardly extending from lateral ends of the first base portion 20, and the pair of first bent wall portions 24, 24 each extending from the respective side wall portions 22, 22 inwardly in a lateral direction and bent to extend downwardly to a base end of the side wall portion 22. The outer upper rail 16 includes the second base portion 26 assembled to the hinge mechanism 38, the vertical wall portion 28 extending from the second base portion 26, and the pair of second bent wall portions 30, 30 outwardly extending from the vertical wall portion 28 in a lateral direction and bent to extend between the side wall portion 22 and the first bent wall portion 24 for supporting the bearing 32. The rotating member 36 is pivotally supported by the attaching member 33 being fixed to the pair of second bent wall portions 30, 30 of the outer upper rail 16 so as to be rotatable about the shaft center in a vertical direction, and the rotating member 36 is provided between the first pair of bent wall portions 24, 24 of the outer lower rail 14.

According to the embodiment of the present invention, because the rotating member 36 which is rotatably supported by the shaft retaining plate 33 fixed between the pair of second bent wall portions 30, 30 of the outer upper rail 16 is configured to rotate while the outer peripheral portion thereof is in contact with one of the pair of the first bent wall portions 24, 24 of the outer lower rail 14, the rotating member 36 receives the lateral spring load by the spring 46 applied to the outer lower rail 14 via the outer upper rail 16 so that the outer upper rail 16 smoothly slides relative to the outer lower rail 14.

According to the embodiment of the seat apparatus, the outer lower rail 14 includes the first base portion 20 adapted to be mounted to the floor 18 serving as the vehicle body, the pair of side wall portions 22, 22 upwardly extending from lateral ends of the first base portion 20, and the pair of first bent wall portions 24, 24 each extending from the respective side wall portions 22, 22 inwardly in a lateral direction and bent to extend downwardly to a base end of the side wall portion 22. The outer upper rail 16 includes the second base portion 26 assembled to the hinge mechanism 38, the vertical wall portion 28 extending from the second base portion 26, and the pair of second bent wall portions 30, 30 outwardly extending from the vertical wall portion 26 in a lateral direction and bent to extend between the side wall portion 22 and the first bent wall portion 24 for supporting the bearing 32. The rotating member 62 is pivotally supported by each of end portions of the attaching member 66 being fixed to the pair of second bent wall portions 30, 30 to extend towards the side wall portions 22, 22 so as to be rotatable about a shaft center in a vertical direction while facing each of the side wall portions 22, 22.

According to the embodiment of the present invention, because the rotating members 62, 62 which are supported on the first and second end portions of the shaft retaining plate 66 which is fixed to the pair of second bent wall portion 30, 30 and extends towards the side wall portions 22, 22 rotate while being in contact with facing side wall portions 22, 22 respectively, the lateral spring load is dispersedly received, and thus downsizing and reducing the seat apparatus for the vehicle in weight.

According to the embodiment of the present invention, when returning the seat in the flipped up position to the position which is ready for the use by the occupant, the hinge mechanism 38 is rotated in a direction against the biasing force of the spring 46 and is retained in a state that stores the large degree of the spring force of the spring 46. Accordingly, the lateral spring load generated by the spring 46 affects the outer lower rail 14 via the outer upper rail 16 which is fixed to the hinge mechanism 38. In those circumstances, because the rotating member 36, 62 which receives the spring load in the lateral direction is provided between the outer upper rail 16 and the outer lower rail 14, the deformation of the outer lower rail 14 and/or the bearing mechanism 32 is prevented so as to smoothly operate the outer slide rail 10. Because it is not necessary to increase a plate thickness of the outer lower rail 14 and to change the material of the bearing mechanism 32 to another with high rigidity in order to prevent the deformation of the outer lower rail 14 and the bearing mechanism 32, the downsized seat apparatus for the vehicle with reduced weight and less manufacturing cost is provided. Further, the seat is flipped up with smaller degree of force without faulty operation.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
an inner slide rail adapted to be mounted to a vehicle body;
an outer slide rail adapted to be mounted to a portion of the vehicle body closer to a wall portion of a vehicle compartment, the outer slide rail including an outer upper rail and an outer lower rail which slidably houses the outer upper rail therein and is adapted to be mounted to the vehicle body;
a seat cushion provided slidably in a longitudinal direction of the vehicle by the inner slide rail and the outer slide rail, the seat cushion configured to be flipped up to the wall portion of the vehicle compartment to be in a storage position;
a hinge mechanism fixing the outer upper rail to the seat cushion;
a bearing smoothly sliding the outer upper rail relative to the outer lower rail;
a spring provided around a rotational shaft of the hinge mechanism for biasing the seat cushion in a direction to be flipped up; and
at least one rotating member provided between the outer upper rail and the outer lower rail so as to receive a load in a lateral direction of the vehicle applied to the outer upper rail by the spring.

2. A seat apparatus according to claim 1, wherein
the outer lower rail includes a first base portion adapted to be mounted to the vehicle body, a pair of side wall portions upwardly extending from lateral ends of the first base portion, and a pair of first bent wall portions each extending from the respective side wall portions inwardly in a lateral direction and bent to extend downwardly to a base end of the side wall portion;
the outer upper rail includes a second base portion assembled to the hinge mechanism, a vertical wall portion extending from the second base portion, and a pair of second bent wall portions outwardly extending from the vertical wall portion in a lateral direction and bent to extend between the side wall portion and the first bent wall portion for supporting the bearing; and wherein
the rotating member is pivotally supported by an attaching member being fixed to the pair of second bent wall portions of the outer upper rail so as to be rotatable about a shaft center in a vertical direction, and the rotating member is provided between the first pair of bent wall portions of the outer lower rail.

3. A seat apparatus according to claim 1, wherein
the outer lower rail includes a first base portion adapted to be mounted to the vehicle body, a pair of side wall portions upwardly extending from lateral ends of the first base portion, and a pair of first bent wall portions each extending from the respective side wall portions inwardly in a lateral direction and bent to extend downwardly to a base end of the side wall portion;

the outer upper rail includes a second base portion assembled to the hinge mechanism, a vertical wall portion extending from the second base portion, and a pair of second bent wall portions outwardly extending from the vertical wall portion in a lateral direction and bent to extend between the side wall portion and the first bent wall portion for supporting the bearing; and wherein the rotating member is pivotally supported by each of end portions of an attaching member being fixed to the pair of second bent wall portions to extend towards the side wall portions so as to be rotatable about a shaft center in a vertical direction while facing each of the side wall portions.

4. A seat apparatus for a vehicle, comprising:

an inner slide rail adapted to be mounted to a vehicle body;

an outer slide rail adapted to be mounted to a portion of the vehicle body closer to a wall portion of a vehicle compartment, the outer slide rail including an outer upper rail and an outer lower rail which slidably houses the outer upper rail therein and is adapted to be mounted to the vehicle body;

a seat provided slidably in a longitudinal direction of the vehicle by the inner slide rail and the outer slide rail, the seat configured to be flipped up to the wall portion of the vehicle compartment to be in a storage position;

a hinge mechanism fixing the outer upper rail to the seat;

a bearing smoothly sliding the outer upper rail relative to the outer lower rail;

a spring provided around a rotational shaft of the hinge mechanism for biasing the seat in a direction to be flipped up; and at least one rotating member provided between the outer upper rail and the outer lower rail so as to receive a load in a lateral direction of the vehicle applied to the outer upper rail by the spring.

5. A seat apparatus for a vehicle, adapted to be provided with a seat cushion being slidable in a longitudinal direction of the vehicle by means of an inner slide rail adapted to be mounted to a vehicle body and an outer slide rail adapted to be mounted to a portion of the vehicle body close to a wall portion, wherein the seat cushion is configured to be flipped up to the wall portion of the vehicle compartment to be in a storage position, comprising:

the outer slide rail including an outer upper rail adapted to be mounted to the seat cushion via a hinge mechanism which includes a spring provided around a rotational shaft of the hinge mechanism for biasing the seat cushion in a direction to be flipped up, and an outer lower rail adapted to be mounted to the vehicle body and housing the outer upper rail therein so as to slide smoothly by means of a bearing; and at least one rotating member provided between the outer upper rail and the outer lower rail so as to receive a load in a lateral direction of the vehicle applied to the outer upper rail by the spring.

6. A seat apparatus according to claim 5, wherein the outer lower rail includes a first base portion adapted to be mounted to the vehicle body, a pair of side wall portions upwardly extending from lateral ends of the first base portion, and a pair of first bent wall portions each extending from the respective side wall portions inwardly in a lateral direction and bent to extend downwardly to a base end of the side wall portion;

the outer upper rail includes a second base portion assembled to the hinge mechanism, a vertical wall portion extending from the second base portion, and a pair of second bent wall portions outwardly extending from the vertical wall portion in a lateral direction and bent to extend between the side wall portion and the first bent wall portion for supporting the bearing; and wherein the rotating member is pivotally supported by an attaching member being fixed to the pair of second bent wall portions of the outer upper rail so as to be rotatable about a shaft center in a vertical direction, and the rotating member is provided between the first pair of bent wall portions of the outer lower rail.

7. A seat apparatus according to claim 5, wherein the outer lower rail includes a first base portion adapted to be mounted to the vehicle body, a pair of side wall portions upwardly extending from lateral ends of the first base portion, and a pair of first bent wall portions each extending from the respective side wall portions inwardly in a lateral direction and bent to extend downwardly to a base end of the side wall portion;

the outer upper rail includes a second base portion assembled to the hinge mechanism, a vertical wall portion extending from the second base portion, and a pair of second bent wall portions outwardly extending from the vertical wall portion in a lateral direction and bent to extend between the side wall portion and the first bent wall portion for supporting the bearing; and wherein the rotating member is pivotally supported by each of end portions of an attaching member being fixed to the pair of second bent wall portions to extend towards the side wall portions so as to be rotatable about a shaft center in a vertical direction while facing each of the side wall portions.

* * * * *